United States Patent
Dwork et al.

(10) Patent No.: US 7,653,615 B2
(45) Date of Patent: *Jan. 26, 2010

(54) PRESERVING PRIVACY WHEN STATISTICALLY ANALYZING A LARGE DATABASE

(75) Inventors: Cynthia Dwork, San Francisco, CA (US); Yaacov Nissim Kobliner, Beer Shava (IL)

(73) Assignee: Microsoft Corporation, Redmond, WA (US)

( * ) Notice: Subject to any disclaimer, the term of this patent is extended or adjusted under 35 U.S.C. 154(b) by 585 days.

This patent is subject to a terminal disclaimer.

(21) Appl. No.: 11/038,446

(22) Filed: Jan. 18, 2005

(65) Prior Publication Data

US 2006/0161527 A1    Jul. 20, 2006

(51) Int. Cl.
*G06F 17/30* (2006.01)
(52) U.S. Cl. .............................. 707/3; 707/9; 707/101
(58) Field of Classification Search .................. 707/3
See application file for complete search history.

(56) References Cited

U.S. PATENT DOCUMENTS

| | | | |
|---|---|---|---|
| 2005/0071337 A1* | 3/2005 | Baranczyk et al. | 707/9 |
| 2007/0156677 A1* | 7/2007 | Szabo | 707/5 |
| 2008/0148070 A1* | 6/2008 | Dettinger et al. | 713/193 |

OTHER PUBLICATIONS

Xintao Wu et. al., "Privacy preserving Database Applicantion Testing", WPES'03, Oct. 30, 2003, 118-128.*

Cynthia Dwork et. al. "Privacy-preserving Datamining on Vertical partitioned Database", CRYPTO, The 24th Annual International Cryptology Conference, 2004, 528-544.*

Randall e. Schumacker, Allen Akers, Understanding statistical Concepts using S-Plus, 2001, pp. 84-89.*

Ferdinand E. Banks, Energy Economics: A Modern Intruduction, 2000, pp. 222-225.*

Cynthia Dwork, Kobbi Nissim, Privacy-Preserving Datamining on Vertically Partitioned Databases, 2004, pp. 528-544.*

Cynthia Dwork, Kobbi Nissim, "Privacy-Preserving Datamining on Vertically Partitioned Databases", CRYPTO, the 24th Annual International Cryptology Conference, 2004, pp. 528-544.*

Xintao Wu et.al., "Privacy Preserving Database Application Testing", WPES'03, Oct. 30, 2003, 118-128.*

Dinur, I. et al., "Revealing Information while Preserving Privacy", *PODS*, 2003, 202-210.

Dwork, C. et al., "Privacy-Preserving Datamining on Vertically Partitioned Databases", *CRYPTO, The 24th Annual International Cryptology Conference*, 2004, 528-544.

* cited by examiner

*Primary Examiner*—Wilson Lee
*Assistant Examiner*—Binh V Ho
(74) *Attorney, Agent, or Firm*—Woodcock Washburn LLP

(57) ABSTRACT

A database has a plurality of entries and a plurality of attributes common to each entry, where each entry corresponds to an individual. A query q is received from a querying entity query q and is passed to the database, and an answer a is received in response. An amount of noise e is generated and added to the answer a to result in an obscured answer o, and the obscured answer o is returned to the querying entity. Thus, a level of protection of privacy is provided to each individual represented within the database.

7 Claims, 4 Drawing Sheets

US 7,653,615 B2

PRESERVING PRIVACY WHEN STATISTICALLY ANALYZING A LARGE DATABASE

TECHNICAL FIELD

The present invention relates to a method for allowing a large database to be analyzed while still preserving privacy with respect to information in the database. More particularly, the present invention relates to such a method whereby a querying entity is deterred from identifying individuals in the database (directly or indirectly), and from gaining sensitive knowledge about individuals.

BACKGROUND OF THE INVENTION

Oftentimes it is desirable to be able to analyze a database to learn statistical information about a population as represented by the database. Typically, a query to such a database is of the form "How many members of a set S of entries/rows in the database satisfies a particular property P?", where such property P may-be expressed as a Boolean formula or as some more complex form of formula.

For example, it may be desirable with regard to a particular database to statistically determine within the population represented thereby whether a correlation may be found between two factors or sets of factors, such as whether with regard to a medical database patients who have heart disease also have a history of smoking tobacco. In particular, a query to a medical database might be fashioned to answer a question such as: "How many individuals as represented within the database are tobacco smokers?", "How many individuals as represented within the database have heart disease?", "How many individuals as represented within the database are tobacco smokers that suffer from heart disease?", and the like.

However, and significantly, it is oftentimes necessary based on a legal or moral standard or otherwise to protect the privacy of individuals as represented within a database under statistical analysis. Thus, a querying entity should not be allowed to directly query for information in the database relating to a particular individual, and also should not be allowed to indirectly query for such information either.

Given a large database, then, perhaps on the order of hundreds of thousands of entries where each entry corresponds to an individual, a need exists for a method to learn statistical information about the population as represented by such a database without compromising the privacy of any particular individual within such population. More particularly, a need exists for such a method by which an interface is constructed between the querying entity and the database, where such interface obscures each answer to a query to a large-enough degree to protect privacy, but not to such a large degree so as to substantively affect statistical analysis of such database.

In at least some instances, the aforementioned large database is vertically partitioned in that a first portion of information with regard to each entry is in a first location and a second portion of the information with regard to each entry is in a second location. For example, it may be that the first location of the database has information regarding particular individuals that suffer from heart disease, and the second location of the database has information regarding which of such particular individuals are tobacco smokers.

As may be appreciated, reasons for such a partition are many and varied, and can include the portions of information having been collected by different entities, at different times, from different sources, and the like. As may also be appreciated, performing statistical analysis on such a vertically partitioned database may be difficult, especially if cross-referencing between the locations based on indicia identifying particular individuals is prohibited due to privacy concerns.

A need exists, then, for a method for statistically analyzing the database based on attributes that are stored in both locations while still satisfying such privacy concerns. In particular, a need exists for such a method where statistics for any Boolean combination of attributes stored in both locations can be learned. Thus, and to continue with the aforementioned example, a statistic such as the increase in risk of heart disease due to smoking can be computed in a privacy-preserving manner. Indeed, all statistics based on any two properties/attributes can be computed without violating privacy concerns.

SUMMARY OF THE INVENTION

The aforementioned needs are satisfied at least in part by the present invention in which a method is provided in connection with a database having a plurality of entries and a plurality of attributes common to each entry, where each entry corresponds to an individual. The method is for providing a level of protection of privacy of the individual. In the method, a query q is received from a querying entity query q and is passed to the database, and an answer a is received in response. An amount of noise e is generated and added to the answer a to result in an obscured answer o, and the obscured answer o is returned to the querying entity.

The aforementioned needs are also satisfied at least in part by the present invention in which a method is provided in connection with the aforementioned database, where the database is partitioned into parts such that a first part includes an attribute A for each entry and a second part includes an attribute B for each entry. The method is for providing a level of protection of privacy of the individual when performing a statistical analysis on the partitioned database based on attributes A and B.

In the method, probability of any particular entry having attributes A and B ($Pr[A]$, $Pr[B]$) are computed, and it is presumed that A implies B in probability with a gap of G if the probability of B given A ($Pr[B|A]$)=$Pr[B]$+G. G is then estimated in an iterative manner by, for a number of times until an estimation of G is settled upon, selecting a Gx and determining whether for such Gx, $Pr[B|A]$>=$Pr[B]$+Gx, and based thereon determining whether G(x+1) should be higher or lower. Thereafter, an estimate of $Pr[B|A]$ is found based on the estimate of G and the computed $Pr[B]$. With the estimated $Pr[B|A]$, standard Boolean arithmetic may then be employed to perform the statistical analysis.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
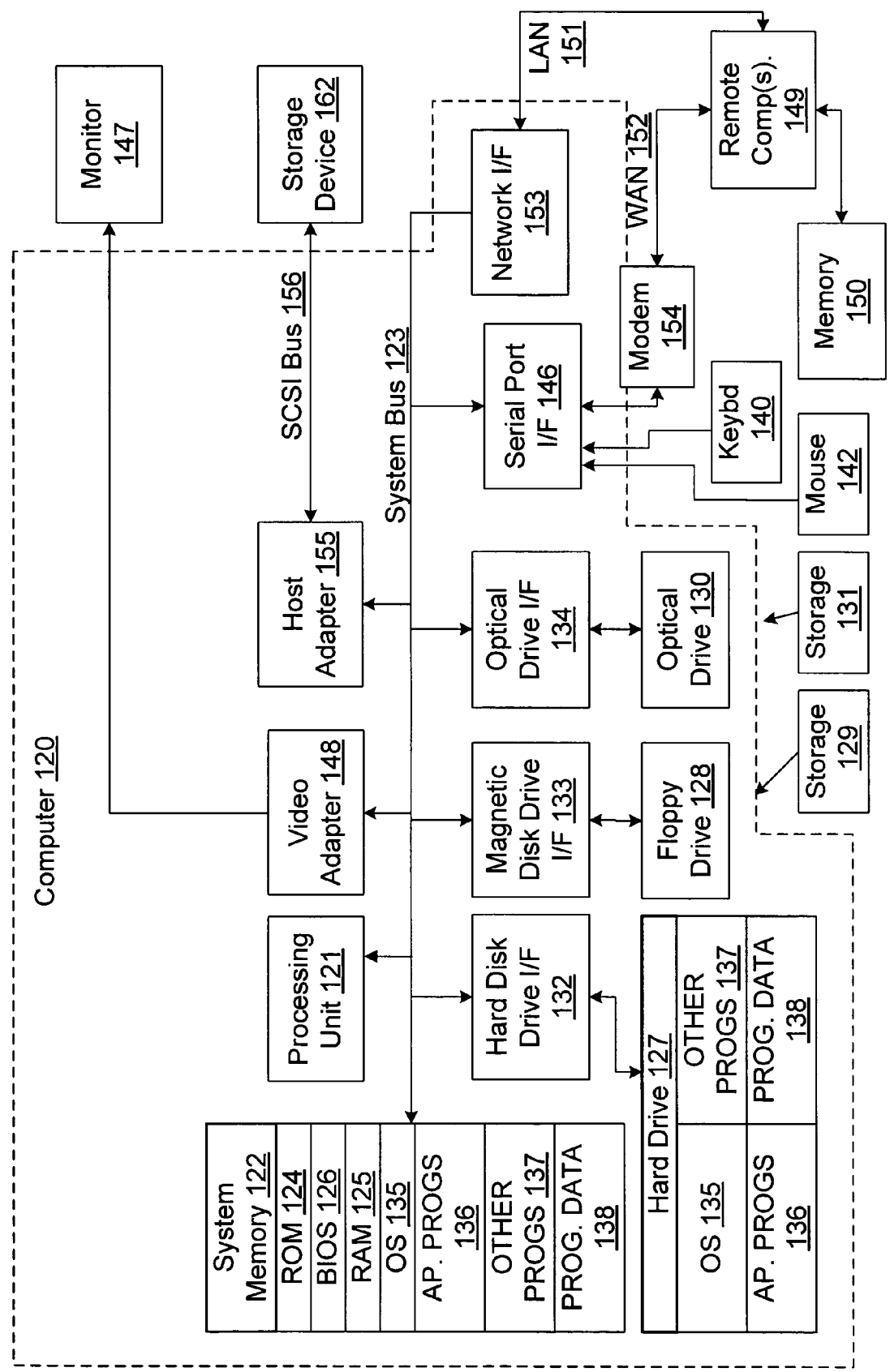
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Preserving Privacy within Database by Adding Noise

Figure 2:
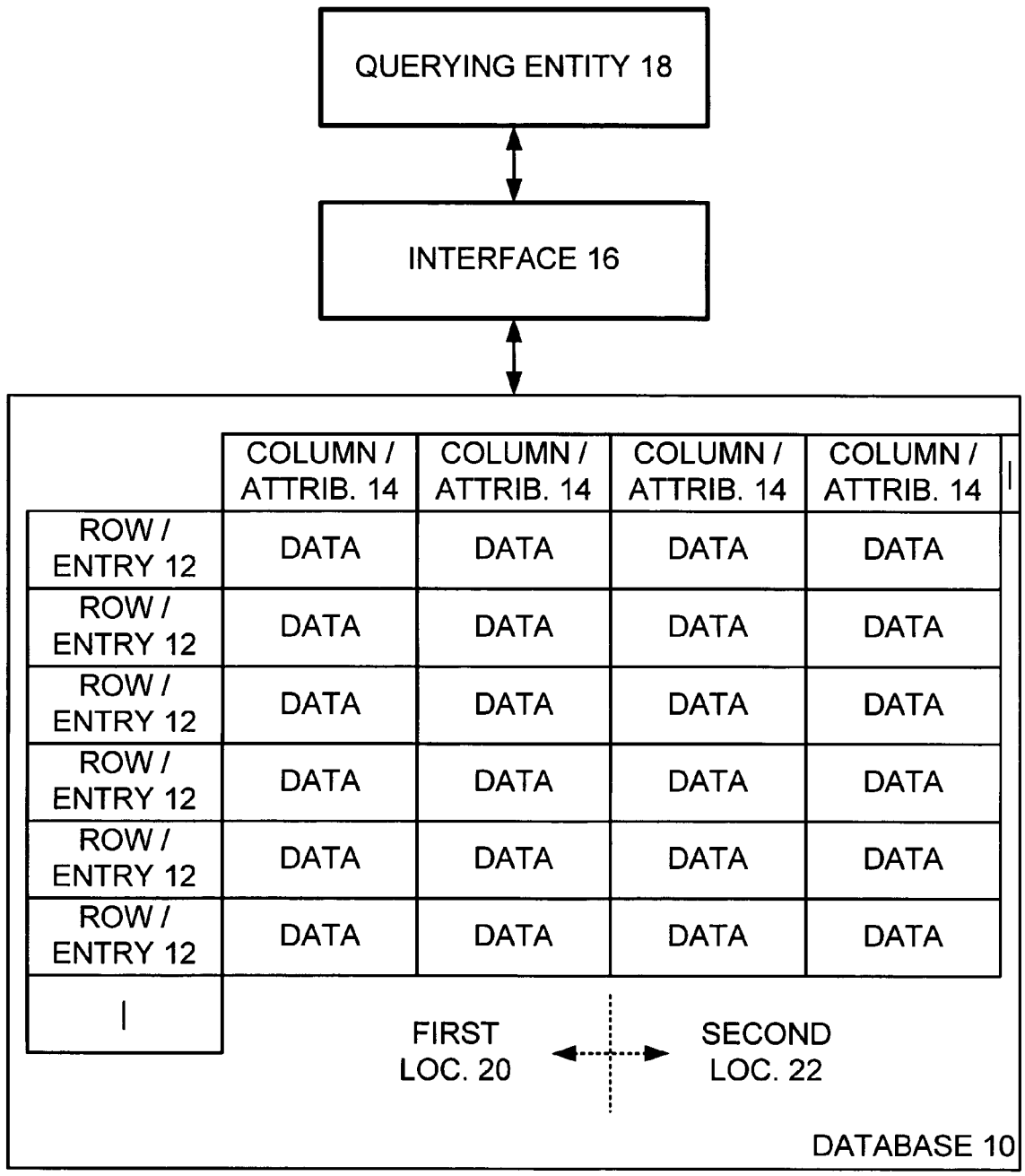
FIG. 2 is a block diagram showing a database such as that which may be employed in connection with the present invention and an interface for allowing a querying entity access to the database.

Referring now to FIG. 2, it is seen that the present invention ensures privacy with regard to information in a database 10. Such database 10 may be any database 10 without departing from the spirit and scope of the present invention, although for purposes of ease it is enough to presume for now that the database 10 is tabular in form with each row 12 representing an entry corresponding to a particular individual, and each column 14 representing an attribute with respect to the individual. For example, it may be that a first column/attribute 14 represents whether the individual corresponding to the row/entry 12 is a tobacco smoker, and that a second column/ attribute 14 represents whether the individual corresponding to the row/entry 12 has heart disease. For either column/attribute 14 with regard to a particular row/entry 12 in the database 10, a negative or affirmative may be represented in a 0/1 binary format or in some other format.

As also seen in FIG. 2, and in one embodiment of the present invention, an interface 16 is provided between a querying entity 18 and the database 10, where such interface 16 obscures each answer to a query as reported to the querying entity 18 to a large-enough degree to protect privacy, but not to such a large degree so as to substantively affect statistical analysis of such database.

Typically, the interface 16 receives each query from the querying entity 18 in the form of a function q(s, f), where s is a definition of the entries/rows 12 of the database 10 that are the focus of the query, and f is a definition of a function that is to be applied to each such defined entry/row 12 of the database 10. Typically, although not necessarily, the result of the function is a binary representative of true/false, and the overall result of the query is a summation of the defined function f over the defined entries/rows 12 s. For example, if s is defined as all entries 12 and f is defined as the entry 12 having a tobacco smoking attribute 14 set to true and also having a heart disease attribute 14 set to true, then the query q would return a total of all entries 12 in the database 10 where the patient is a tobacco smoker with heart disease.

In at least some instances, and as was set forth above, it may be necessary to protect the privacy of individuals as represented within the entries 12 of the database 10 when under statistical analysis. Thus, and again, the querying entity 18 may not be allowed to query for information in the database 10 relating to a particular individual as represented by an entry 12. To such an end, then, any name information in the database 10 may for example be made unavailable to the querying entity 18. However, it may still be the case that a querying entity 18 with knowledge of at least some attributes 14 corresponding to a particular individual may locate the entry 12 for such individual based on such attributes 14, and then review other attributes 14 relating to such entry 12 in the database 10.

Thus, in an effort to provide privacy to individuals represented in the entries 12 of the database 10, the interface 16 in the course of returning a query result to a querying entity adds a small amount of error or 'noise' to the query result to obscure same to a large-enough degree to protect privacy, but not to such a large degree so as to substantively affect statistical analysis of such database 10. In particular, and remembering that any sampling of a set of n entries 12, each having a given property with a constant probability, has a built-in sampling error such that the result of the sampling likely should be within about a few standard deviations (roughly, square root of n) of the expected value, the added noise is selected by the interface 16 to be much smaller than such square root of n value. Accordingly, and again, the added noise is enough to obscure the returned query result, but is not so large as to be significant with regard to built-in sampling error.

Figure 3:
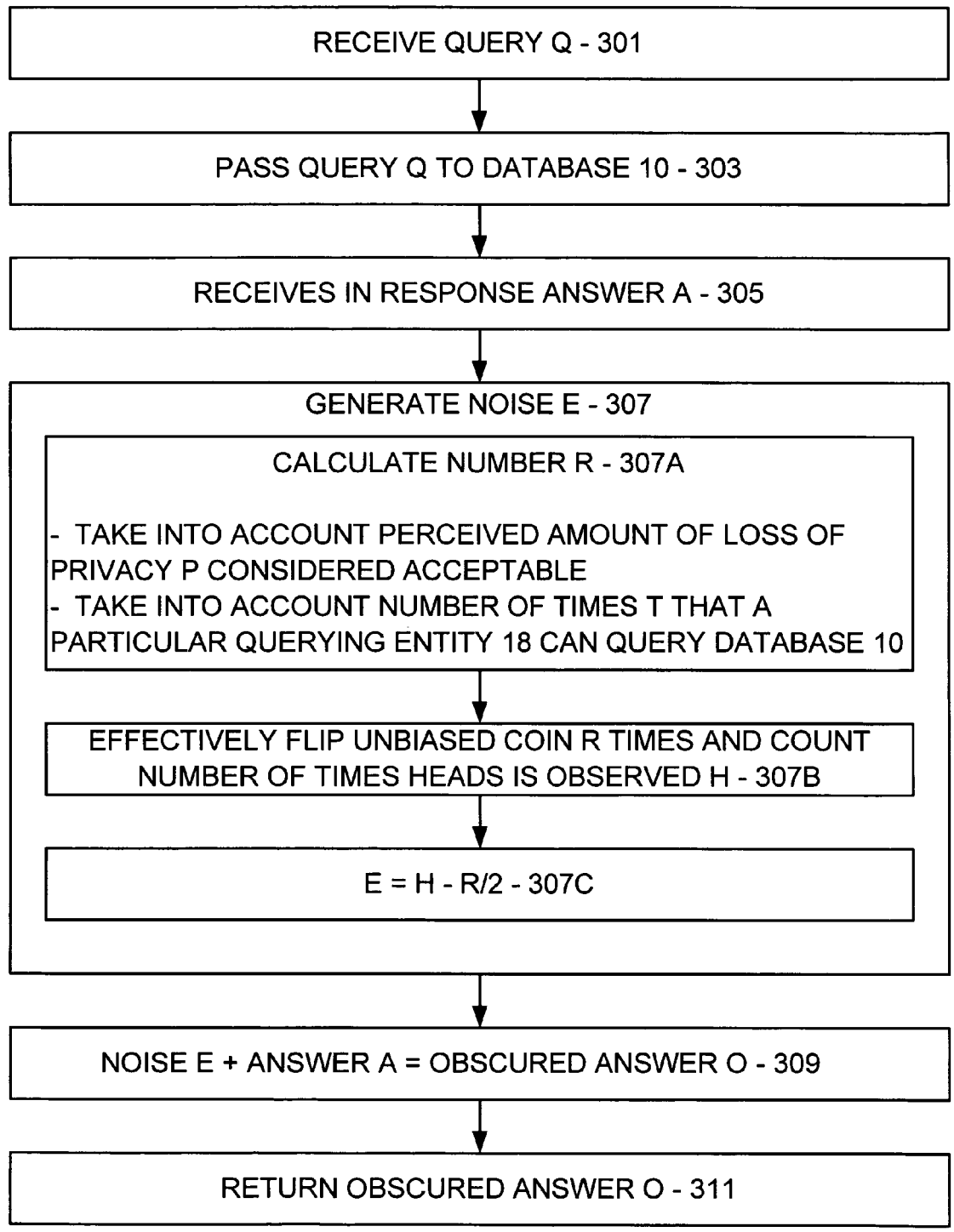
FIG. 3 is a flow diagram showing key steps performed by the interface of FIG. 2 in responding to a query for the database from the querying entity in accordance with one embodiment of the present invention so as to preserve a level of privacy with respect to individuals represented within the database.

In one embodiment of the present invention, and turning now to FIG. 3, the interface 16 operates in the following manner. Preliminarily, the interface 16 receives from the querying entity 18 a query q (step 301), passes the query q to the database 10 (step 303), and receives in response an answer a (step 305). Thereafter, the interface 16 generates the added noise e (step 307), adds same to the answer a to result in an obscured answer o (step 309), and returns the obscured answer o to the querying entity (step 311). In order to generate the added noise e as at step 307 to be an appropriate magnitude (i.e., much smaller than the square root of n), and in one embodiment of the present invention, the interface 16 calculates a number r (step 307a), effectively flips an unbiased coin r times and counts a number of times heads is observed h (step 307b), and subtracts r/2 from h to result in e (step 307c).

While the aforementioned method maintains some measure of privacy with regard to the individuals represented within the entries 12 of the database 10, it is to be understood that, almost by definition, any query against the database results in some loss of privacy. That is, the simple act of gaining an answer, even an obscured answer o, means that something that was formerly not public is now in fact public. Accordingly, in one embodiment of the present invention, calculating r as at step 307a is performed by the interface 16 by taking into account a perceived amount of loss of privacy p that is considered acceptable.

Moreover, while the aforementioned method maintains some measure of privacy with regard to a particular query, it is also to be understood that given enough queries by a particular querying entity 18, the querying entity 18 may overcome the aforementioned privacy safeguards. For one example, although asking the same query many times should result in slightly different answers, all of the slightly different answers taken as a whole should lead to a more correct cumulative answer. For another example, even though a single query may not produce a particular sought-after answer, asking multiple different queries that circumspect the sought-after answer likely should produce same, even though such different queries result in obscured answers o. Accordingly, in one embodiment of the present invention, calculating r as at step 307a is performed by the interface 16 by also taking into account a number of times t that a particular querying entity 18 can query the database 10. Presumably, the interface 16 enforces the number of times t as a limitation against the querying entity 18.

In one embodiment of the present invention, the number of time t may be defined as:

$$t = O(n^c) \text{ for some } c < 1,$$

such that t is sub-linear in n, and r is calculated as:

$$r = (t/p^2) \cdot \log^\mu n \text{ for some } \mu > 0.$$

For example, μ may be set to 6. A more-developed discussion of calculating r and a proof of privacy may be found in *Privacy-Preserving Datamining on Vertically Partitioned Databases*, Dwork and Nissim, CRYPTO 2004—The 24th Annual International Cryptology Conference, Aug. 15-19, 2004, Santa Barbara, Calif., USA, Proceedings, page 528, Springer-Verlag, hereby incorporated by reference in its entirety, and therefore need not be set forth herein in any detail.

Notably, and bearing in mind that the calculation of r should result in a number greater than 1, but again much less than the square root of n, n should be a very large number, perhaps on the order of at least 10,000 or 100,000. However, such a requirement is not believed to be onerous in view of the fact that statistical analysis of the sort envisioned herein is indeed often performed on large databases with numbers n of entries 12 on the order of hundreds of thousands. Of course, n should be as large as possible, especially if the statistical analyses performed are intended to find trends having relatively small probabilities, perhaps on the order of one in a thousand.

Preserving Privacy Across Partitioned Database 10

As was set forth above, and as is shown in FIG. 2, in at least some instances, the database 10 may be partitioned such that at least some attributes/columns 14 of each entry/row 12 are in a first location 20 and at least some other attributes/columns 14 of each entry/row 12 are in a second location 22. Thus, to continue with the above example, it may be that the first location 20 of the database 10 has a heart disease attribute 14 for each patient/entry 12, and the second location 22 of the database 10 has a tobacco smoker attribute 14 for such patient 12.

Such partitioning of the database may occur conceptually, where both locations 20, 22 are within a single server, for example, or may occur physically, where both locations 20, 22 are geographically separate, for example, without departing from the spirit and scope of the present invention. As was set forth above, reasons for such a partition are many and varied, and can include the portions of information having been collected by different entities, at different times, from different sources, and the like.

Performing statistical analysis on such a vertically partitioned database 10 may be difficult for a variety of reasons. For one thing, it may be that the locations 20, 22 of the database 10 are under differing ownership and the owners have not agreed to allow the kind of copying that may be necessary to create a non-partitioned form of the database 10. For another, such copying may be excessively difficult or even impossible, especially if the database 10 is very large. For yet another, cross-referencing between the locations 20, 22 based on indicia identifying particular individuals/entries 12 may be prohibited due to privacy concerns.

For purposes of the present invention, it is to be presumed that a database 10 of n entries 12 is partitioned into two parts D1 and D2, that D1 has a particular attribute 14 hereinafter referred to as A, and that D2 has a particular attribute 14 hereinafter referred to as B. Typically, A and B are binary attributes 14 in that each is 1 in a particular entry if the corresponding individual indeed possesses such attribute 14 and is 0 if not. However, A and B may also be other types of attributes 14 or sets of attributes 14 without departing from the spirit and scope of the present invention.

Within such partitioned database 10, then, the probability of any particular entry 12 having attribute A (i.e., $Pr[A]$) is the total number of entries 12 with attribute A set to 1 divided by all entries 12 in the database, and $Pr[B]$ is similarly calculated. In addition, the probability of any particular entry 12 having both attributes A and B (i.e., $Pr[A \text{ and } B]$) is the total number of entries 12 with attribute A set to 1 and attribute B set to 1 divided by all entries 12 in the database. Moreover, the probability that having attribute A implies having attribute B (i.e., the probability of B given A, or $Pr[B|A]$) is $Pr[A \text{ and } B]$ divided by $Pr[A]$.

Figure 4:
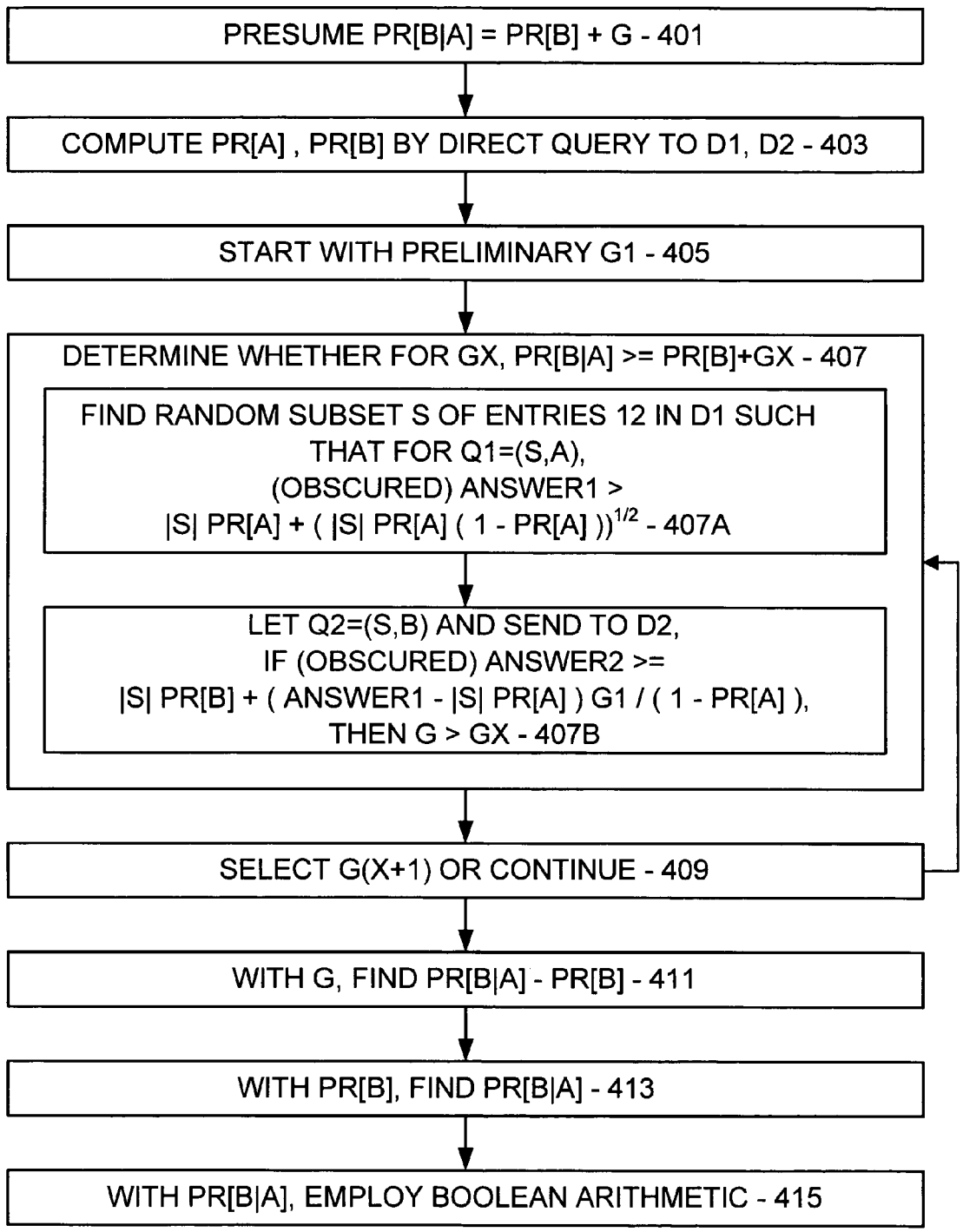
FIG. 4 is a flow diagram showing key steps performed in connection with the database of FIG. 2 when partitioned so as to allow cross-partition statistical analysis of such database in accordance with one embodiment of the present invention.

At any rate, in one embodiment of the present invention, illustrated in FIG. 4, cross-partition analysis on such a database 10 is performed based on determining $Pr[A|B]$ from knowledge of $Pr[A]$ and $Pr[B]$ in the following manner. Preliminarily, it may be presumed that A implies B in probability with a gap of G if $Pr[B|A]=Pr[B]+G$ (step 401). That is, the probability that B holds given that A is true is G greater than the probability that B holds in the general population of the database 10.

As may be appreciated, $Pr[A]$ and $Pr[B]$ are easily computed within the database 10 by direct query to each of D1 and D2, respectively (step 403). Note, though, that inasmuch as the computational error is inversely proportional to the square root of the number of entries n sampled in the database 10, n should be made sufficiently large simply by querying the D1 and D2 of the database 10 on sufficiently large sets of entries/rows 12.

The goal, then, is to determine G, or, equivalently, $Pr[B|A]-Pr[B]$. In general, G is determined by starting with a preliminary G1 (step 405) and determining whether for such G1, $Pr[B|A]>=Pr[B]+G1$ (step 407). An iterative process is then performed with subsequent Gs (i.e., G2, G3, etc.) in the manner of a binary search until G is estimated, and by extension $Pr[B|A]$ is estimated. Notably, once an estimated $Pr[B|A]$ is found, standard Boolean arithmetic may be employed to estimate statistics/probabilities for any Boolean function of A and B.

Given $Pr[A]$, $Pr[B]$, let X be a random variable counting the number of times A holds when taking N samples from database 10. As should be appreciated, $E[X]=N\ Pr[A]$, and $Var[X]=N\ Pr[A](1-Pr[A])$.

Starting with:

$$Pr[B|A]=Pr[B]+G,$$

and appreciating that:

$$Pr[B]=Pr[A]Pr[B|A]+(1-Pr[A])Pr[B|\overline{A}],$$

$Pr[B|\overline{A}]$ may be re-written as:

$$Pr[B|\overline{A}]=Pr[B]-G\ Pr[A]/(1-Pr[A]),$$

Which may be re-phrased as:

$$Pr[B|A]-Pr[B|\overline{A}]=G/(1-Pr[A]),$$

Now, given a selected G1, it is determined whether G is greater than or equal to such G1 by finding a heavy but not very heavy set for attribute A. That is, a set S of entries 12 is found within D1 where $Pr[A]$ within S exceeds $Pr[A]$ for the overall D1:

find random subset $S$ of entries 12 in $D1$ such that for $q1=(S,A)$, (obscured) answer1$>|S|Pr[A]+(|S|Pr[A](1-Pr[A]))^{1/2}$ (step 407a).

In one embodiment of the present invention, the number of entries 12 satisfying A exceeds an expected value by more than a standard deviation.

Thereafter, D2 is queried based on the found set S. In particular, if the incidence of B on such set S sufficiently exceeds the expected incidence of B, as a function of G1, then success is determined:

Let $q2=(S,B)$ and send to $D2$, if (obscured) answer2$>=|S|Pr[B]+($answer1$-|S|Pr[A])G1/(1-Pr[A])$, then success (step 407b)

otherwise, failure is found. That is, success indicates that G is in fact greater than G1, while failure indicates that G is in fact less than G1.

As may now be appreciated, the aforementioned steps may be repeated with an appropriately selected G2 to find whether G is in fact greater or less than G2, and such steps are again repeated with an appropriately selected G3, G4, etc., for however many iterations are deemed necessary to zone in on a reasonable approximation of G (step 409). For example, if binary searching based on halves is performed 5 times, G may be narrowed down to within about 1/32, and if binary searching based on such halves is performed 10 times, G may be further narrowed down to within about 1/1024.

Again, based on knowledge of G, an estimate of $Pr[B|A]-Pr[B]$ is found (step 411), and based on knowledge of $Pr[B]$, an estimate of $Pr[B|A]$ is found (step 413). Finally, and again, once an estimated $Pr[B|A]$ is found, standard Boolean arithmetic may be employed to estimate statistics/probabilities for any Boolean function of A and B (step 415).

Similar to that which was set forth above, a more-developed discussion of finding Pr[A|B] and a proof of privacy may be found in *Privacy-Preserving Datamining on Vertically Partitioned Databases*, Dwork and Nissim, CRYPTO 2004—The 24th Annual International Cryptology Conference, Aug. 15-19, 2004, Santa Barbara, Calif., USA, Proceedings, page 528, Springer-Verlag, hereby incorporated by reference in its entirety, and therefore need not be set forth herein in any detail.

CONCLUSION

The present invention may be practiced with regard providing privacy when statistically analyzing any appropriate database 10, presuming of course that all limitations set forth herein are abided. As should now be appreciated, with the present invention as set forth herein, such statistical analysis may be performed while maintaining a reasonable amount of privacy of individuals represented within the database 10.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method to learn statistical information about the population as represented within a sufficiently large database 10 without compromising the privacy of any particular individual within such population. An interface 16 is constructed between the querying entity 18 and the database 10, where such interface 16 obscures each answer to a query to a large-enough degree to protect privacy, but not to such a large degree so as to substantively affect statistical analysis of such database 10. The present invention also comprises a method for statistically analyzing the database 10 based on attributes that are stored in partitioned portions while still satisfying such privacy concerns, such that statistics for any Boolean combination of attributes stored in such partitions can be learned.

It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A method in connection with a database having a plurality of entries and a plurality of attributes common to each entry, each entry corresponding to an individual, the method for providing a level of protection of privacy of the individual, the method comprising:

receiving at a interface a query q from a querying entity; passing the query q to the database; receiving at a interface an answer a in response to the query q;

generating an amount of noise e at the interface by calculating a number r, effectively flipping an unbiased coin r times and counting a number of times heads is observed h, and subtracting r/2 from h to result in e, wherein r is calculated at least in part based on a number of times t that a particular querying entity queries the database and e generating an amount of noise e based at least in part on a perceived amount of loss of privacy p that is considered acceptable and small enough to be insignificant with regard to built-in sampling error;

adding the noise e to the answer a at the interface to result in an obscured answer o; and the interface returning the obscured answer o to the querying entity.

2. The method of claim 1 wherein each attribute for each entry is represented as binary data.

3. The method of claim 1 comprising generating an amount of noise e that obscures the answer a to a large-enough degree to protect privacy, but not to such a large degree so as to substantively affect statistical analysis of the database.

4. The method of claim 1, comprising determining t as:

$t=O(n^c)$ for some $c<1$, such that t is sub-linear in n.

5. A computer apparatus comprising:

a memory having stored thereon a database having a plurality of entries and a plurality of attributes common to each entry, each entry corresponding to an individual; and a processor programmed to perform the steps of:

receiving a query q from a querying entity and for passing the query q to the database;

receiving from the database an answer a in response to the query q; generating an amount of noise e by calculating a number r, effectively flipping an unbiased coin r times and counting a number of times heads is observed h, and subtracting r/2 from h to result in e and for adding the noise e to the answer a to result in an obscured answer o, wherein r is calculated at least in part based on a number of times t that a particular querying entity queries the database and e generates an amount of noise e based at least in part on a perceived amount of loss of privacy p that is considered acceptable and small enough to be insignificant with regard to built-in sampling error; and returning the obscured answer o to the querying entity.

6. The computer apparatus of claim 5 wherein an amount of noise e is generated that obscures the answer a to a large-enough degree to protect privacy, but not to such a large degree so as to substantively affect statistical analysis of the database.

7. The computer apparatus of claim 5, wherein the noise generating means determines t as:

$t=O(n^c)$ for some $c<1$, such that t is sub-linear in n.

* * * * *